US012659127B2

(12) United States Patent
Yuan et al.

(10) Patent No.:  US 12,659,127 B2
(45) Date of Patent:  Jun. 16, 2026

(54) RATE MATCHING FOR FULL DUPLEX COMMUNICATIONS

(71) Applicant: QUALCOMM Incorporated, San Diego, CA (US)

(72) Inventors: Fang Yuan, Beijing (CN); Sony Akkarakaran, Poway, CA (US); Yan Zhou, San Diego, CA (US); Danlu Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/548,296

(22) PCT Filed: May 12, 2021

(86) PCT No.: PCT/CN2021/093249
§ 371 (c)(1),
(2) Date: Aug. 29, 2023

(87) PCT Pub. No.: WO2022/236729
PCT Pub. Date: Nov. 17, 2022

(65) Prior Publication Data
US 2024/0129101 A1  Apr. 18, 2024

(51) Int. Cl.
*H04W 72/12*  (2023.01)
*H04L 1/00*  (2006.01)
(Continued)

(52) U.S. Cl.
CPC .............. *H04L 5/14* (2013.01); *H04L 1/0067* (2013.01); *H04W 72/1268* (2013.01); *H04W 72/1273* (2013.01); *H04W 72/232* (2023.01)

(58) Field of Classification Search
None
See application file for complete search history.

(56) References Cited

U.S. PATENT DOCUMENTS

2020/0145166 A1* 5/2020 Yum ..................... H04L 5/0048
2022/0200777 A1* 6/2022 Lee ........................... H04L 5/16
(Continued)

FOREIGN PATENT DOCUMENTS

CN        106063178 A  * 12/2014  ............... H04L 5/00
CN        111263446 A      6/2020
(Continued)

OTHER PUBLICATIONS

Ericsson: "Summary of 7.1.3.3 (Resource Allocation)", TSG-RAN WG1 #94, R1-1809702, Gothenburg, Sweden, Aug. 20-24, 2018, (Aug. 24, 2018), 28 Pages.
(Continued)

*Primary Examiner* — Abdullahi Ahmed
*Assistant Examiner* — Ahmed Saifuddin
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may obtain an indication of at least one rate matching configuration. The UE may communicate in a full duplex communication mode, wherein communicating in the full duplex communication mode comprises rate matching based at least in part on the at least one rate matching configuration. Numerous other aspects are described.

30 Claims, 9 Drawing Sheets

(51) Int. Cl.
  *H04L 5/14*    (2006.01)
  *H04W 72/1268*  (2023.01)
  *H04W 72/1273*  (2023.01)
  *H04W 72/232*   (2023.01)

(56)      References Cited

U.S. PATENT DOCUMENTS

| 2023/0300839 | A1* | 9/2023 | Jung | H04L 5/0094 |
| 2023/0318798 | A1* | 10/2023 | Su | H04W 72/54 |
| | | | | 370/329 |
| 2023/0327934 | A1* | 10/2023 | El Hamss | H04W 52/365 |
| | | | | 370/329 |

FOREIGN PATENT DOCUMENTS

| EP | 3322118 A1 | 5/2018 |
| WO | WO-2021000312 | 1/2021 |

OTHER PUBLICATIONS

International Search Report and Written Opinion—PCT/CN2021/093249—ISA/EPO—Jan. 26, 2022.

\* cited by examiner

600

610　Obtain an indication of at least one rate matching configuration

620　Communicate in a full duplex communication mode, wherein communicating in the full duplex communication mode comprises rate matching based at least in part on the at least one rate matching configuration 710  Obtain an indication of at least one rate matching configuration 720  Communicate in a full duplex communication mode, wherein communicating in the full duplex communication mode comprises rate matching based at least in part on the at least one rate matching configuration

700

RATE MATCHING FOR FULL DUPLEX COMMUNICATIONS

CROSS-REFERENCE TO RELATED APPLICATION

This Patent Application is a 371 national stage of PCT Application No. PCT/CN2021/093249 filed on May 12, 2021, entitled "RATE MATCHING FOR FULL DUPLEX COMMUNICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for rate matching for full duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit (TX) power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous CDMA (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a node B (NB), a gNB, an access point (AP), a radio head, a transmit receive point (TRP), a New Radio (NR) BS, a 5G NB, or the like.

The above multiple access technologies have been adopted in various telecommunication standards to provide a common protocol that enables different UE to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the DL, using CP-OFDM and/or SC-FDM (e.g., also known as discrete Fourier transform spread OFDM (DFT-s-OFDM)) on the UL, as well as supporting beamforming, multiple-input multiple-output (MIMO) antenna technology, and carrier aggregation. As the demand for mobile broadband access continues to increase, further improvements in LTE, NR, and other radio access technologies (RATs) remain useful.

SUMMARY

In some aspects, a method of wireless communication performed by a user equipment (UE) includes obtaining an indication of at least one rate matching configuration; and communicating in a full duplex communication mode, wherein communicating in the full duplex communication mode comprises rate matching based at least in part on the at least one rate matching configuration.

In some aspects, a method of wireless communication performed by a base station (BS) includes obtaining an indication of at least one rate matching configuration; and communicating in a full duplex communication mode, wherein communicating in the full duplex communication mode comprises rate matching based at least in part on the at least one rate matching configuration.

In some aspects, a UE for wireless communication includes a memory; and one or more processors, coupled to the memory, configured to: obtain an indication of at least one rate matching configuration; and communicate in a full duplex communication mode, wherein the one or more processors, to communicate in the full duplex communication mode, are configured to rate match based at least in part on the at least one rate matching configuration.

In some aspects, a BS for wireless communication includes a memory; and one or more processors, coupled to the memory, configured to: obtain an indication of at least one rate matching configuration; and communicate in a full duplex communication mode, wherein the one or more processors, to communicate in the full duplex communication mode, are configured to rate match based at least in part on the at least one rate matching configuration.

In some aspects, a non-transitory computer-readable medium storing a set of instructions for wireless communication includes one or more instructions that, when executed by one or more processors of a UE, cause the UE to: obtain an indication of at least one rate matching configuration; and communicate in a full duplex communication mode, wherein the one or more instructions, to cause the UE to communicate in the full duplex communication mode, cause the UE to rate match based at least in part on the at least one rate matching configuration.

In some aspects, a non-transitory computer-readable medium storing a set of instructions for wireless communication includes one or more instructions that, when executed by one or more processors of a BS, cause the BS to: obtain an indication of at least one rate matching configuration; and communicate in a full duplex communication mode, wherein the one or more instructions, to cause the BS to communicate in the full duplex communication mode, cause the BS to rate match based at least in part on the at least one rate matching configuration.

In some aspects, an apparatus for wireless communication includes means for obtaining an indication of at least one rate matching configuration; and means for communicating in a full duplex communication mode, wherein the means for communicating in the full duplex communication mode comprise means for rate matching based at least in part on the at least one rate matching configuration.

In some aspects, an apparatus for wireless communication includes means for obtaining an indication of at least one rate matching configuration; and means for communicating in a full duplex communication mode, wherein the means for communicating in the full duplex communication mode comprise means for rate matching based at least in part on the at least one rate matching configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
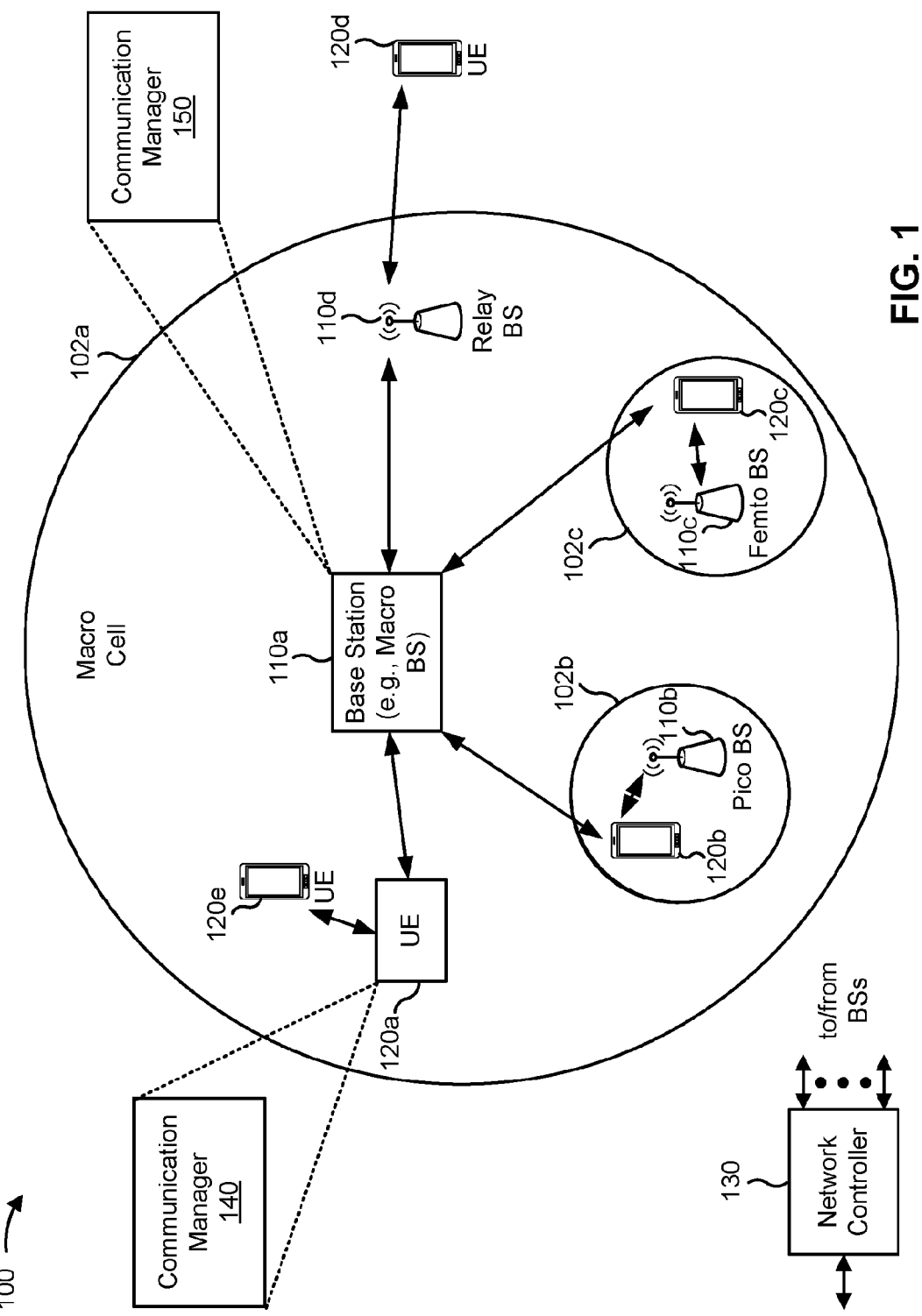
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS)

is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may obtain an indication of at least one rate matching configuration; and communicate in a full duplex communication mode, wherein communicating in the full duplex communication mode comprises rate matching based at least in part on the at least one rate matching configuration. Additionally, or alternatively, the communication manager 140 may perform one or more other operations described herein.

In some aspects, the base station 110 may include a communication manager 150. As described in more detail elsewhere herein, the communication manager 150 may obtain an indication of at least one rate matching configuration; and communicate in a full duplex communication mode, wherein communicating in the full duplex communication mode comprises rate matching based at least in part on the at least one rate matching configuration. Additionally, or alternatively, the communication manager 150 may perform one or more other operations described herein.

As indicated above, FIG. 1 is provided as an example. Other examples may differ from what is described with regard to FIG. 1.

Figure 2:
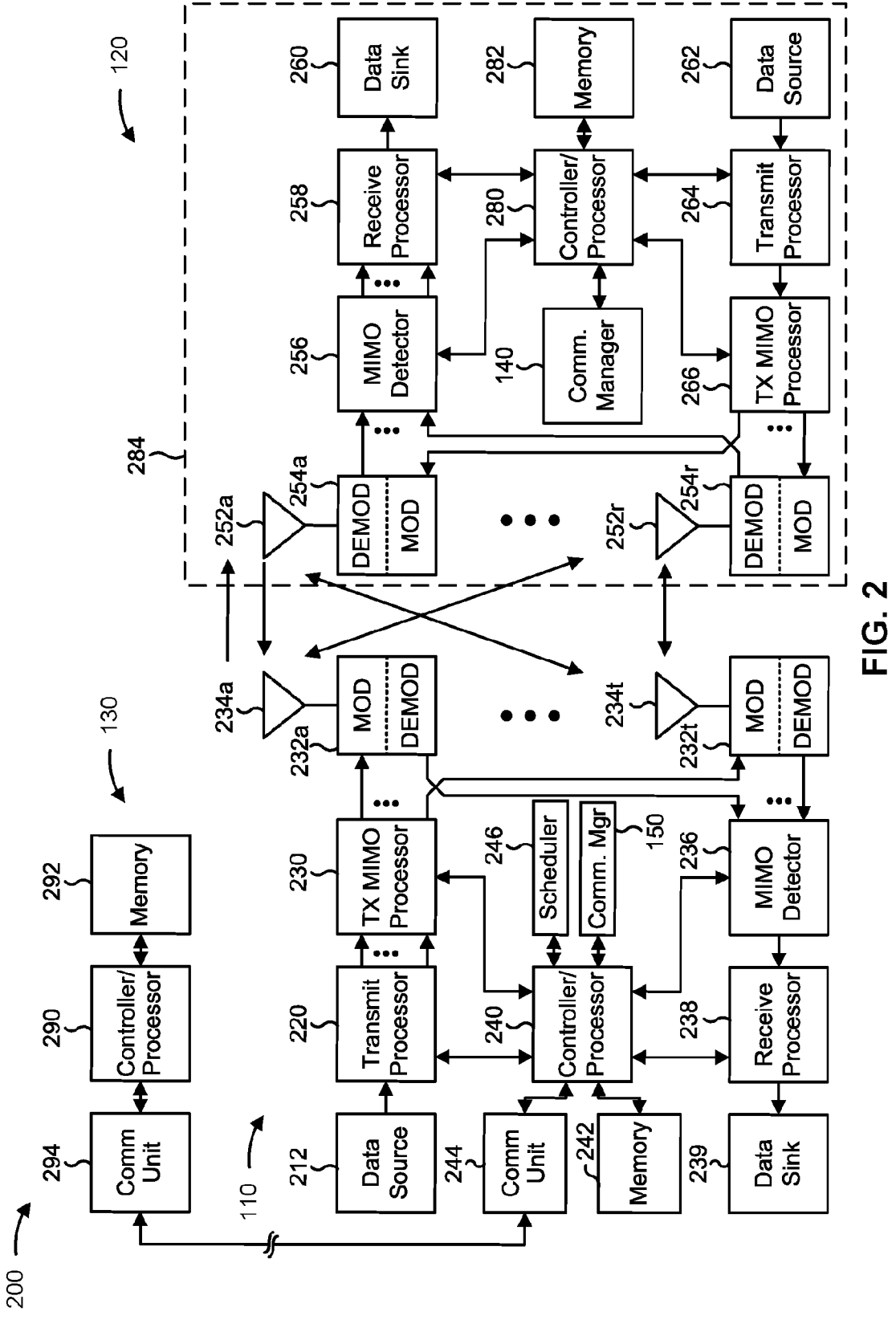
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with rate matching for full duplex communications, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for obtaining an indication of at least one rate matching configuration; and/or means for communicating in a full duplex communication mode, wherein communicating in the full duplex communication mode comprises rate matching based at least in part on the at least one rate matching configuration. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for obtaining an indication of at least one rate matching configuration; and/or means for communicating in a full duplex communication mode, wherein communicating in the full duplex communication mode comprises rate matching based at least in part on the at least one rate matching configuration. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3B:
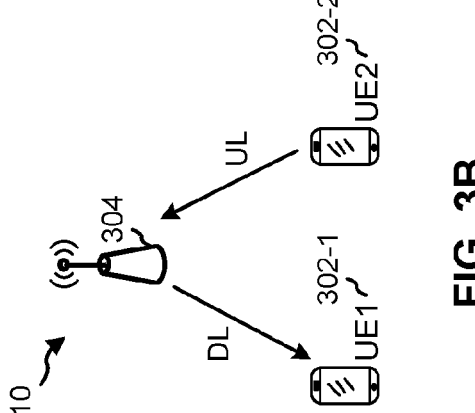
FIGS. 3A-3C are diagrams illustrating examples of full duplex communication, in accordance with the present disclosure.
Figure 3C:
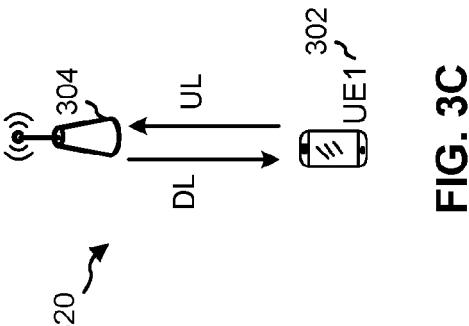
Figure 3A:
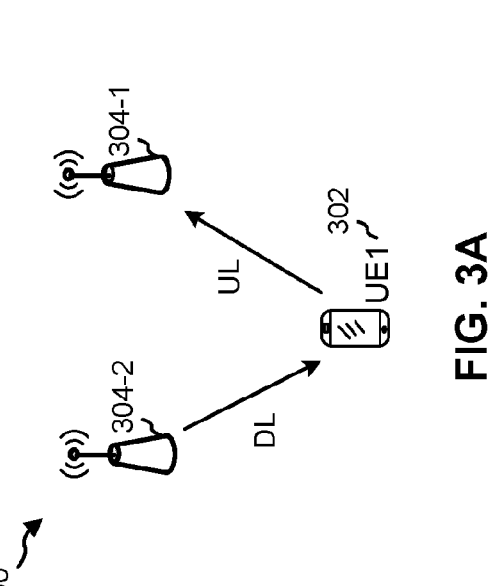

FIGS. 3A-3C are diagrams illustrating examples 300, 310, 320 of full duplex communication in accordance with the present disclosure. The example 300 of FIG. 3A includes a UE1 302 and two base stations 304-1, 304-2 (e.g., TRPs), wherein the UE1 302 is sending uplink transmissions to base station 304-1 and is receiving downlink transmissions from base station 304-2. In the example 300 of FIG. 3A, full duplex is enabled for the UE1 302, but not for the base stations 304-1, 304-2. The example 310 of FIG. 3B includes two UEs, UE1 302-1 and UE2 302-2, and a base station 304, wherein the UE1 302-1 is receiving a downlink transmission from the base station 304 and the UE2 302-2 is transmitting an uplink transmission to the base station 304. In the example 310 of FIG. 3B, full duplex is enabled for the base station 304, but not for the UEs UE1 302-1 and UE2 302-2. The example 320 of FIG. 3C includes a UE1 302 and a base station 304, wherein the UE1 302 is receiving a downlink transmission from the base station 304 and the UE1 302 is transmitting an uplink transmission to the base station 304. In the example 320 of FIG. 3C, full duplex is enabled for both the UE1 302 and the base station 304.

As indicated above, FIGS. 3A-3C are provided as one or more examples. Other examples may differ from what is described with regard to FIGS. 3A-3C.

Figure 4:
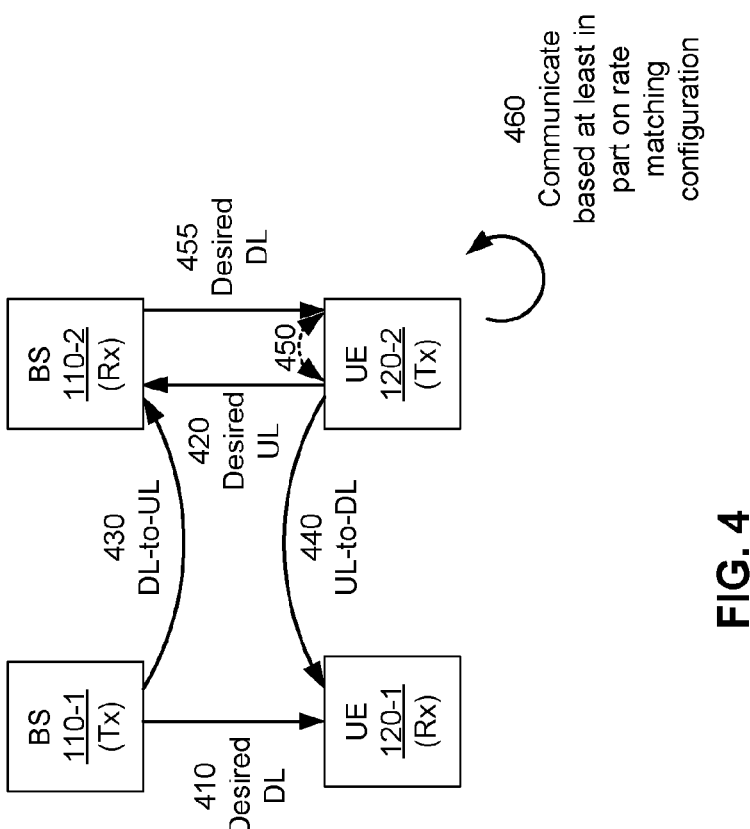
FIG. 4 is a diagram illustrating an example relating to cross-link interference, in accordance with the present disclosure.

FIG. 4 is a diagram illustrating an example 400 relating to cross-link interference detection and mitigation, in accordance with the present disclosure.

In dynamic time division duplexing (TDD), the allocation of network resources to uplink and downlink may be dynamically modified depending on a traffic load. For example, a base station 110 may configure a TDD configuration (e.g., a TDD pattern) with more uplink transmission time intervals (TTIs) (e.g., frames, subframes, slots, mini-slots, and/or symbols) for a UE 120 when the UE 120 has uplink data to transmit, and base station 110 may configure a TDD configuration with more downlink TTIs for the UE 120 when the UE 120 has downlink data to receive. The TDD configuration may be dynamically configured to modify the allocation of uplink TTIs and downlink TTIs used for communication between the base station 110 and the UE 120.

As shown in FIG. 4, when neighboring base stations 110 use different TDD configurations to communicate with UEs 120, this may result in a downlink communication 410 between a first base station 110-1 and a first UE 120-1 in a same TTI as an uplink communication 420 between a second base station 110-2 and a second UE 120-2. These communications in different transmission directions (e.g., downlink vs. uplink) in the same TTI may interfere with one another, which may be referred to as cross-link interference.

For example, as shown by reference number 430, the downlink communication 410 transmitted by the first base station 110-1 may be received by the second base station 110-2, and may interfere with reception, by the second base station 110-2, of the uplink communication 420 from the second UE 120-2. This may be referred to as downlink-to-uplink (DL-to-UL) interference, base station to base station interference, or gNB-to-gNB interference.

Further, as shown by reference number 440, the uplink communication 420 transmitted by the second UE 120-2 may be received by the first UE 120-1, and may interfere with reception, by the first UE 120-1, of the downlink communication 410 from the first base station 110-1. This may be referred to as uplink-to-downlink (UL-to-DL) interference or UE-to-UE interference. In some aspects, the UE 120-1 may be operating within a first cell (e.g., provided by the first base station 110-1), and the UE 120-2 may be operating within a second cell (e.g., provided by the second base station 110-2). In this case, the UE-to-UE interference may be referred to as inter-cell interference. This UE to UE interference may occur and/or may increase when the first UE 120-1 and the second UE 120-2 are in close proximity, and may be avoided or mitigated by preventing scheduling of the UEs 120 in different transmission directions in the same TTI.

When a UE is operating in a full duplex communication mode, additional interference may be introduced. For example, as shown by reference number 450, the uplink communication 420 transmitted by the second UE 120-2 may be received by the second UE 120-2, and may interfere with reception, by the second UE 120-2, of the downlink communication 455 from the second base station 110-2. This interference may be referred to as self-interference and/or intra-cell interference.

In some half duplex communication cases, downlink rate matching may be supported to facilitate avoidance and/or reduction of collision with downlink control channels, synchronization signal block (SSB) signals, channel state information reference signals (CSI-RSs), and/or LTE cell-specific reference signals, among other examples. However, downlink rate matching may not facilitate avoidance and/or reduction of interference due to uplink transmissions that may be, in a full duplex communication mode, transmitted using the same time-frequency resources as downlink receptions. As a result, full duplex communications without uplink rate matching may result in unnecessary interference, thereby having a negative impact on network performance.

Some aspects of the techniques and apparatuses described herein may provide for uplink rate matching for full duplex communications. In some aspects, for example, the UE 120-2 may obtain at least one rate matching configuration. In some aspects, the at least one rate matching configuration may include a downlink configuration. As shown by reference number 460, the UE 120-2 may communicate based at least in part on the at least one rate matching configuration.

In this way, some aspects may facilitate uplink rate matching in full duplex communications to avoid and/or reduce interference, thereby having a positive impact on network performance.

As indicated above, FIG. 4 is provided as an example. Other examples are possible and may differ from what was described with respect to FIG. 4.

Figure 5:
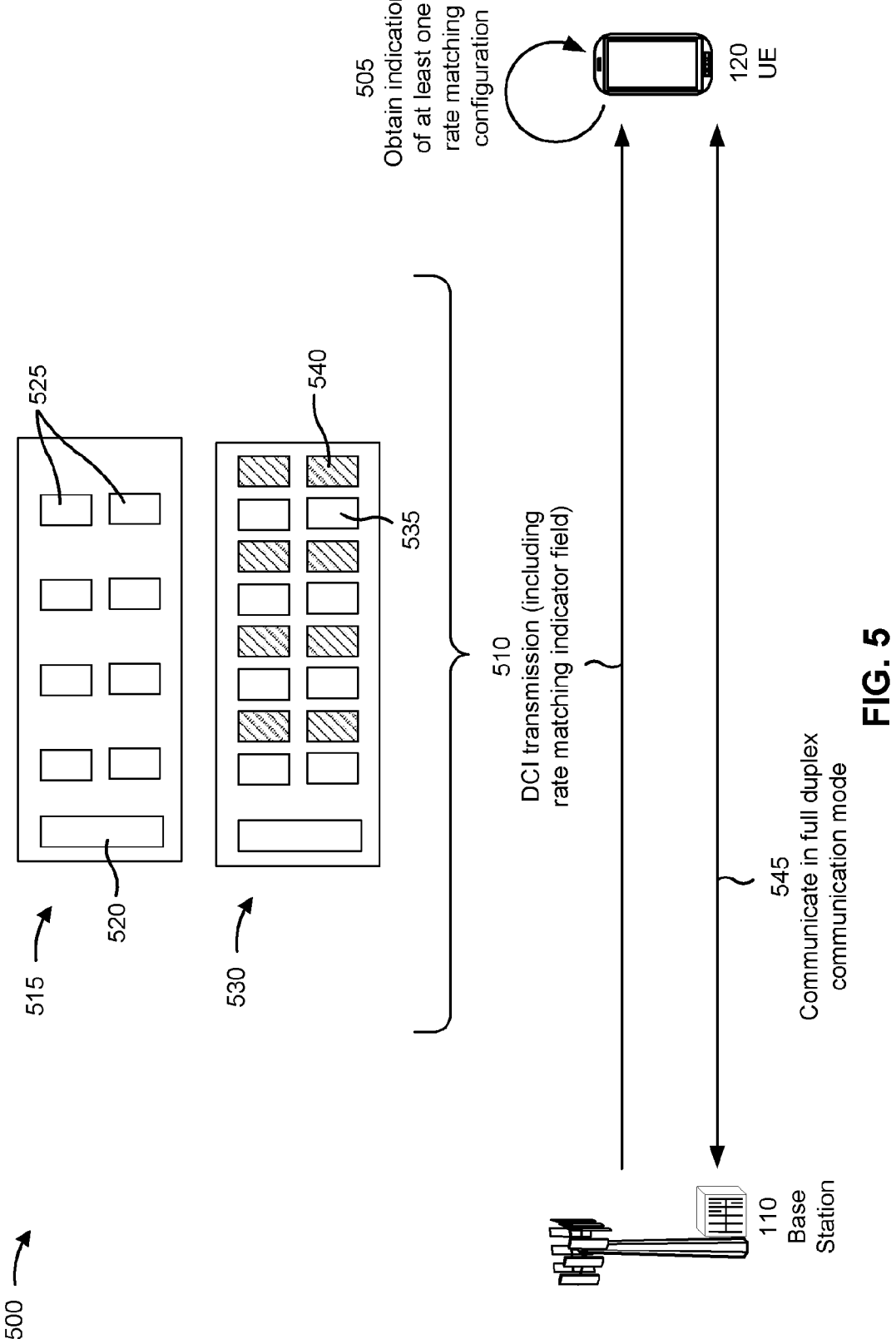
FIG. 5 is a diagram illustrating an example associated with rate matching for full duplex communications, in accordance with the present disclosure.

FIG. 5 is a diagram illustrating an example 500 of rate matching for full duplex communications, in accordance with the present disclosure. As shown in FIG. 5, a base station 110 and a UE 120 may communicate with one another.

As shown by reference number 505, the UE 120 may obtain an indication of at least one rate matching configuration. In some aspects, for example, the UE 120 may be configured with the at least one rate matching configuration. For example, the base station 110 may transmit the at least one rate matching configuration to the UE 120 using a radio resource control (RRC) message. In some aspects, the UE 120 may obtain the at least one rate matching configuration based at least in part on a wireless communication standard.

In some aspects, the at least one rate matching configuration may include at least one downlink configuration. In some aspects, the UE 120 may obtain the at least one downlink configuration by receiving an indication of the at least one downlink configuration. The UE 120 may receive the indication from the base station 110 or another base station (not shown).

In some aspects, the downlink configuration may include a rate matching pattern indication value of a parameter rateMatchPattemToAddWodList, which may be provided as part of a physical downlink shared channel (PDSCH) configuration (e.g., provided using a PDSCH-Config parameter). In a parameter of rateMatchPatternToAddModList, the UE 120 may be configured with multiple rate match patterns. In some aspects, the at least one rate matching configuration may include a control resource set (CORESET) configuration. In some aspects, the UE 120 may obtain the indication of the at least one downlink configuration by obtaining a rate match pattern list that indicates the downlink rate match pattern. The UE 120 may obtain the rate match pattern list by receiving a PDSCH configuration that includes the rate match pattern list.

In some aspects, the at least one rate matching configuration may include, or be included in, one or more SSB configurations and/or one or more periodic reference signal configuration corresponding to a CSI-RS. The CSI-RS may include at least one of a non-zero power (NZP) CSI-RS or a zero-power (ZP) CSI-RS. The indication of the at least one downlink configuration may be included in a serving cell configuration that indicates a CRS, which is related to a CRS pattern in an LTE cell. For example, a parameter, lte-CRS-ToMatchAround carried in a configuration such as a ServingCellConfg or a ServingCellConfigCommon, may indicate the at least one rate matching configuration.

In some aspects, as shown by reference number 510, the base station 110 may transmit, and the UE 120 may receive, a downlink control information (DCI) transmission that includes a rate matching indicator field. In this way, UE 120 may obtain the at least one rate matching configuration by receiving a DCI transmission that includes an indication of the at least one rate matching configuration from the base station 110. In some aspects, the DCI transmission may include one or more resource allocations. In some aspects, the DCI is a DCI scheduling an uplink transmission, and the rate matching indicator field in the DCI may select at least one out of the multiple rate match patterns configured for the UE 120 to be rate matched in scheduled uplink transmission. The rate matching indicator field may indicate a set of rate matching resources for dynamically scheduled physical uplink shared channel (PUSCH) transmissions, and the rate matching indicator may be configured to indicate downlink resources and/or a downlink numerology, among other examples. In this way, the UE 120 may precode the uplink resources for uplink transmissions to facilitate rate matching around the downlink resources, and/or the UE 120 may determine coding rates and resources to match the downlink numerology in cases in which the uplink numerology is different than the downlink numerology. In some aspects, the UE 120 may preclude the uplink resources which is overlapped with the resources indicated by the rate match pattern for the scheduled uplink transmissions. When the resources of a CORESET, SSB or CSI-RS are indicated in the rate match pattern, the UE 120 may exclude some part of uplink resources scheduled by the DCI which are overlapping with the resources indicated by the rate match pattern, and apply the remaining part of uplink resources scheduled by the DCI for uplink transmissions.

As shown in FIG. 5, for example, a resource allocation 515 may include a CORESET 520 that the UE 120 may rate match around. In some aspects, the resource allocation 515 may include a set of periodical ZP CSI-RS resources 525. In some aspects, the resource allocation 515 may include NZP CSI-RS resources. As shown, a resource allocation 530 may include a set of dedicated downlink rate matching resources 535 that the UE 120 may rate match around for transmitting uplink resources 540.

In some aspects, in a full duplex communication mode, the UE 120 may receive a PDSCH communication based at least in part on a rate matching operation associated with at least one uplink resource to be rate matched. The at least one uplink resource may include at least one of a sounding reference signal (SRS) resource set identifier (ID), a dedicated rate matching pattern, or an uplink numerology.

As shown by reference number 545, the base station 110 and the UE 120 may communicate in a full duplex communication mode. For example, in some aspects, the base station 110 and the UE 120 may rate match based at least in part on the at least one rate matching configuration.

In some aspects, rate matching may be determined based at least in part on relative physical protocol level priorities. For example, in some aspects, the UE 120 may determine a first physical protocol level priority associated with a communication to be communicated and a second physical protocol level priority associated with at least one resource indicated by the rate matching configuration. The UE 120 may rate match based at least in part on the first physical protocol level priority and the second physical protocol level priority. For example, the UE 120 may rate match around a low priority uplink resource for a high priority downlink resource or vice-versa. In some aspects, rate matching based at least in part on physical protocol level priority may be used in connection with periodical uplink transmissions (e.g., configured grants, channel state information (CSI) reports, and/or SRS transmissions having a higher priority than an identified downlink reception) and/or periodical downlink receptions (e.g., semi-persistent scheduling (SPS) PDSCH receptions). In some aspects, the physical protocol level priority may be explicitly provided in an RRC parameterphy-Priorityindex to a downlink or uplink channel or resources. In some other aspects, the physical protocol level priority may be implicitly determined based on the type of a downlink or uplink channel or resources. For example, the SPS PDSCH receptions may be prioritized over PUSCH transmission.

In some aspects, communicating according to a rate matching configuration may include rate matching around resources such that a communication may be transmitted and/or received using a first numerology in a manner that can be communicated in accordance with a second numerology. For example, in some aspects, the UE 120 may determine that an uplink communication channel has a first numerology and may determine that a downlink communication channel has a second numerology that is different from the first numerology. The UE 120 may determine a rate matching pattern based at least in part on the rate matching configuration and the first and second numerologies. For example, the first numerology for uplink may be a 30 Khz numerology and the second numerology for downlink may be a 15 Khz numerology.

For example, in some aspects, the UE 120 may blank out at least one of a tone adjacent to the rate matching pattern or a symbol adjacent to the rate matching pattern to prevent and/or reduce inter-tone leakage. In some aspects, the UE 120 may blank out adjacent OFDM symbols to the indicated pattern, to prevent and/or minimize cross-symbol leakage. In some aspects, for example, the UE 120 may obtain an indication of one or more blanking parameters and may blank the at least one tone and/or symbol based at least in part on the indication of the one or more blanking parameters. The one or more blanking parameters may be obtained from the base station 110 via an RRC configuration and/or a numerology-specific blanking parameter table.

As indicated above, FIG. 5 is provided as an example. Other examples may differ from what is described with respect to FIG. 5.

Figure 6:
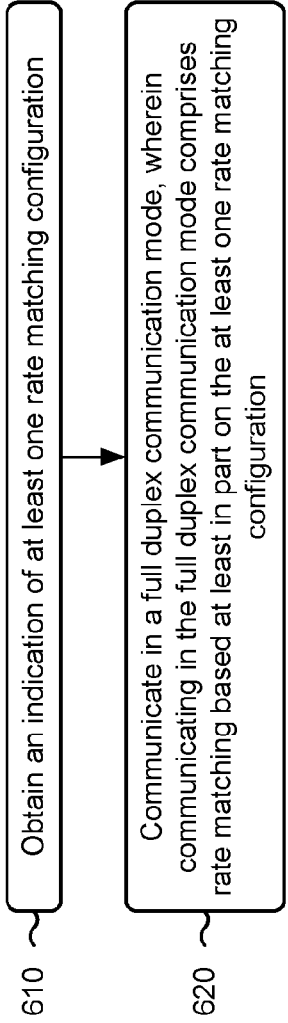
FIGS. 6 and 7 are diagrams illustrating example processes associated with rate matching for full duplex communications, in accordance with the present disclosure.

FIG. 6 is a diagram illustrating an example process 600 performed, for example, by a UE, in accordance with the present disclosure. Example process 600 is an example where the UE (e.g., UE 120) performs operations associated with rate matching for full duplex communications.

As shown in FIG. 6, in some aspects, process 600 may include obtaining an indication of at least one rate matching configuration (block 610). For example, the UE (e.g., using communication manager 140 and/or reception component 802, depicted in FIG. 8) may obtain an indication of at least one rate matching configuration, as described above.

As further shown in FIG. 6, in some aspects, process 600 may include communicating in a full duplex communication mode, wherein communicating in the full duplex communication mode comprises rate matching based at least in part on the at least one rate matching configuration (block 620). For example, the UE (e.g., using communication manager 140, reception component 802, and/or transmission component 804, depicted in FIG. 8) may communicate in a full duplex communication mode, wherein communicating in the full duplex communication mode comprises rate matching based at least in part on the at least one rate matching configuration, as described above.

Process 600 may include additional aspects, such as any single aspect or any combination of aspects described below and/or in connection with one or more other processes described elsewhere herein.

In a first aspect, the at least one rate matching configuration comprises at least one downlink configuration, wherein communicating in the full duplex communication mode comprises transmitting a PUSCH communication, and wherein transmitting the PUSCH communication comprises rate matching around the at least one downlink configuration.

In a second aspect, alone or in combination with the first aspect, the at least one downlink configuration comprises a downlink rate match pattern.

In a third aspect, alone or in combination with the second aspect, the downlink rate match pattern comprises a CORE-SET configuration.

In a fourth aspect, alone or in combination with one or more of the second through third aspects, obtaining the indication of the at least one downlink configuration comprises obtaining a rate match pattern list that indicates the downlink rate match pattern.

In a fifth aspect, alone or in combination with the fourth aspect, obtaining the rate match pattern list comprises receiving a PDSCH configuration, wherein the PDSCH configuration includes the rate match pattern list.

In a sixth aspect, alone or in combination with one or more of the first through fifth aspects, the at least one downlink configuration comprises at least one of a synchronization signal block configuration or a periodic reference signal configuration corresponding to a CSI-RS.

In a seventh aspect, alone or in combination with the sixth aspect, the CSI-RS comprises at least one of a non-zero power CSI-RS or a zero-power CSI-RS.

In an eighth aspect, alone or in combination with one or more of the first through seventh aspects, obtaining the indication of the at least one downlink configuration comprises receiving a serving cell configuration that indicates a CRS.

In a ninth aspect, alone or in combination with one or more of the first through eighth aspects, the indication of the at least one downlink configuration comprises an indicator field of a DCI transmission that indicates a set of rate matching resources for rate matching dynamically scheduled PUSCH transmissions, wherein the PUSCH communication comprises a dynamically scheduled transmission.

In a tenth aspect, alone or in combination with the ninth aspect, the indicator field of the DCI transmission indicates at least one of a downlink resource or a downlink numerology.

In an eleventh aspect, alone or in combination with one or more of the first through tenth aspects, the at least one rate matching configuration comprises at least one uplink resource to be rate matched, wherein communicating in the full duplex communication mode comprises receiving a PDSCH communication based at least in part on a rate matching operation associated with the at least one uplink resource.

In a twelfth aspect, alone or in combination with the eleventh aspect, the at least one uplink resource comprises at least one of a sounding reference signal resource set identifier, a dedicated rate matching pattern, or an uplink numerology.

In a thirteenth aspect, alone or in combination with one or more of the first through twelfth aspects, process 600 includes determining a first physical protocol level priority associated with a communication to be communicated, and determining a second physical protocol level priority associated with at least one resource indicated by the rate matching configuration, wherein the rate matching comprises rate matching based at least in part on the first physical protocol level priority and the second physical protocol level priority.

In a fourteenth aspect, alone or in combination with one or more of the first through thirteenth aspects, process 600 includes determining that an uplink communication channel has a first numerology, determining that a downlink communication channel has a second numerology that is different from the first numerology, determining a rate matching pattern based at least in part on the rate matching configuration, and blanking out at least one of a tone adjacent to the rate matching pattern or a symbol adjacent to the rate matching pattern.

In a fifteenth aspect, alone or in combination with the fourteenth aspect, process 600 includes obtaining an indication of one or more blanking parameters, wherein blanking out the at least one of the tone or the symbol comprises blanking out the at least one of the tone or the symbol based at least in part on the indication of the one or more blanking parameters.

In a sixteenth aspect, alone or in combination with the fifteenth aspect, obtaining the indication of the one or more blanking parameters comprises at least one of receiving a radio resource control message or obtaining a numerology-specific blanking parameter table.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
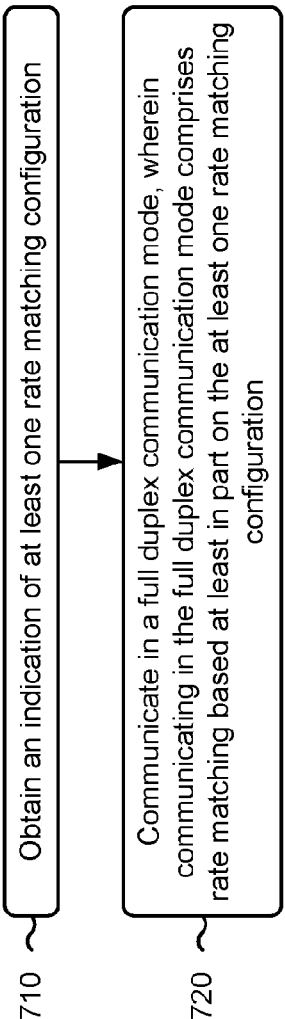

FIG. 7 is a diagram illustrating an example process 700 performed, for example, by a base station, in accordance with the present disclosure. Example process 700 is an example where the base station (e.g., base station 110) performs operations associated with rate matching for full duplex communications.

As shown in FIG. 7, in some aspects, process 700 may include obtaining an indication of at least one rate matching configuration (block 710). For example, the base station (e.g., using communication manager 150 and/or reception component 902, depicted in FIG. 9) may obtain an indication of at least one rate matching configuration, as described above.

As further shown in FIG. 7, in some aspects, process 700 may include communicating in a full duplex communication mode, wherein communicating in the full duplex communication mode comprises rate matching based at least in part on the at least one rate matching configuration (block 720). For example, the base station (e.g., using communication manager 150, reception component 902, and/or transmission component 904, depicted in FIG. 9) may communicate in a full duplex communication mode, wherein communicating in the full duplex communication mode comprises rate matching based at least in part on the at least one rate matching configuration, as described above.

Process 700 may include additional aspects, such as any single aspect or any combination of aspects described below and/or in connection with one or more other processes described elsewhere herein.

In a first aspect, the at least one rate matching configuration comprises at least one downlink configuration, wherein communicating in the full duplex communication mode comprises receiving a PUSCH communication, and wherein the PUSCH communication is rate matched around the at least one downlink configuration.

In a second aspect, alone or in combination with the first aspect, the at least one downlink configuration comprises a downlink rate match pattern.

In a third aspect, alone or in combination with the second aspect, the downlink rate match pattern comprises a CORE-SET configuration.

In a fourth aspect, alone or in combination with the third aspect, obtaining the indication of the at least one downlink configuration comprises obtaining a rate match pattern list that indicates the downlink rate match pattern.

In a fifth aspect, alone or in combination with the fourth aspect, process 700 includes transmitting a PDSCH configuration, wherein the PDSCH configuration includes the rate match pattern list.

In a sixth aspect, alone or in combination with one or more of the first through fifth aspects, the at least one downlink configuration comprises at least one of a synchronization signal block configuration, a CSI-RS, or a parameter that indicates a CRS.

In a seventh aspect, alone or in combination with one or more of the first through sixth aspects, the indication of the at least one downlink configuration comprises an indicator field of a DCI transmission that indicates a set of rate matching resources for rate matching dynamically scheduled PUSCH transmissions, wherein the PUSCH communication comprises a dynamically scheduled transmission, wherein the indicator field of the DCI transmission indicates at least one of a downlink resource or a downlink numerology.

In an eighth aspect, alone or in combination with one or more of the first through seventh aspects, the at least one rate matching configuration comprises at least one uplink resource to be rate matched, wherein communicating in the full duplex communication mode comprises transmitting a PDSCH communication based at least in part on a rate matching operation associated with the at least one uplink resource.

In a ninth aspect, alone or in combination with the eighth aspect, the at least one uplink resource comprises at least one of a sounding reference signal resource set identifier, a dedicated rate matching pattern, or an uplink numerology.

In a tenth aspect, alone or in combination with one or more of the first through ninth aspects, process 700 includes transmitting an indication of one or more blanking parameters.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
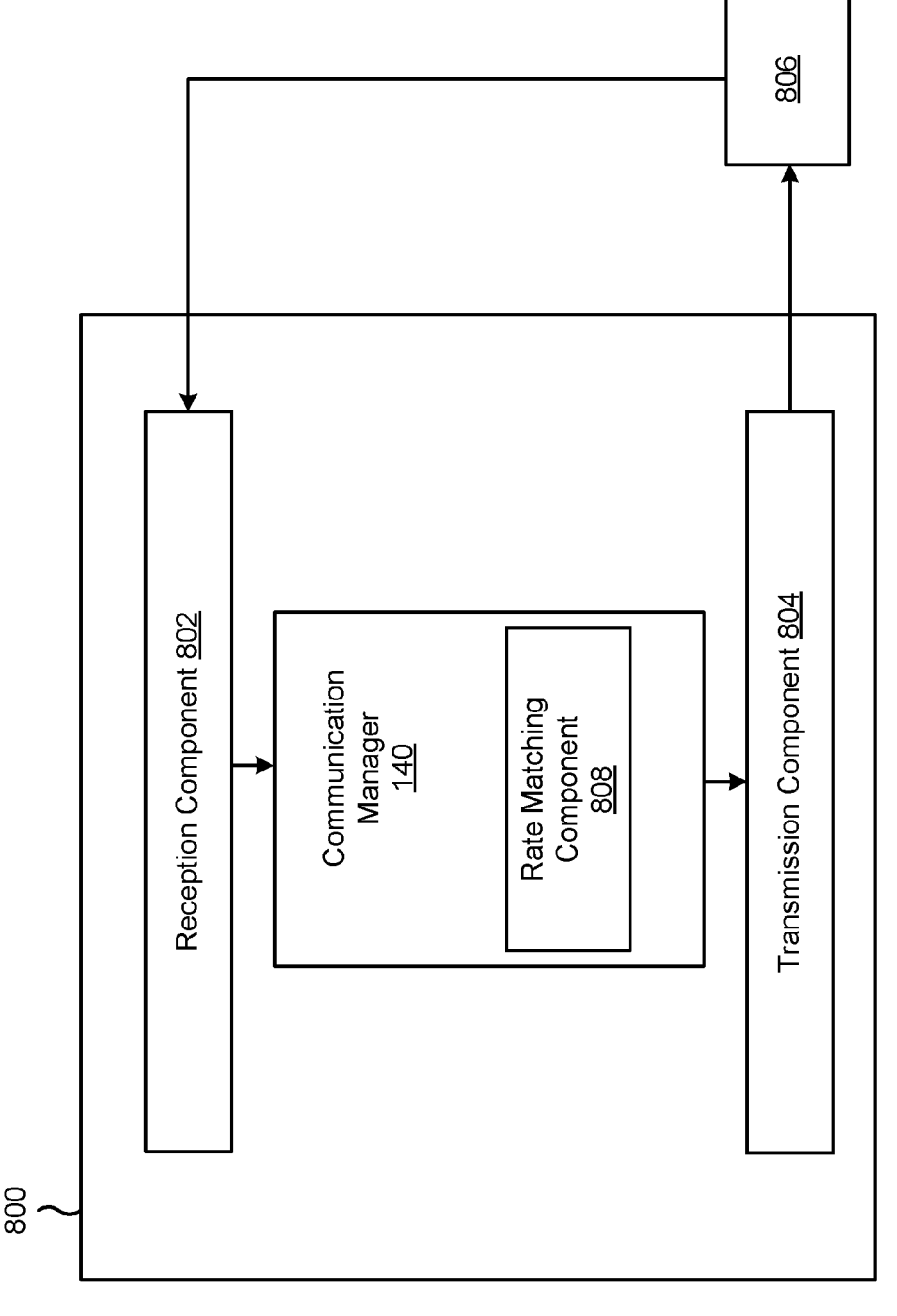
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a rate matching component 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 and/or the communication manager 140 may obtain an indication of at least one rate matching configuration. The reception component 802, the transmission component 804, and/or the rate matching component 808 may communicate in a full duplex communication mode, wherein communicating in the full duplex communication mode comprises rate matching based at least in part on the at least one rate matching configuration. In some aspects, the communication manager 140 may include one or more antennas, a modulator, a transmit MIMO processor, a transmit processor, a controller/processor, a memory, or a combination thereof, of the UE described above in connection with FIG. 2. In some aspects, the communication manager 140 may include the reception component 802, the transmission component 804, and/or the rate matching component 808.

The rate matching component 808 may determine a first physical protocol level priority associated with a communication to be communicated. The rate matching component 808 may determine a second physical protocol level priority associated with at least one resource indicated by the rate matching configuration wherein the rate matching comprises rate matching based at least in part on the first physical protocol level priority and the second physical protocol level priority. In some aspects, the rate matching component 808 may include one or more antennas, a modulator, a transmit MIMO processor, a transmit processor, a controller/processor, a memory, or a combination thereof, of the UE described above in connection with FIG. 2. In some aspects, the rate matching component 808 may include the reception component 802 and/or the transmission component 804.

The rate matching component 808 may determine that an uplink communication channel has a first numerology. The rate matching component 808 may determine that a downlink communication channel has a second numerology that is different from the first numerology. The rate matching component 808 may determine a rate matching pattern based at least in part on the rate matching configuration.

The rate matching component 808 may blank out at least one of a tone adjacent to the rate matching pattern or a symbol adjacent to the rate matching pattern. The rate matching component 808 may obtain an indication of one or more blanking parameters, wherein blanking out the at least one of the tone or the symbol comprises blanking out the at least one of the tone or the symbol based at least in part on the indication of the one or more blanking parameters.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
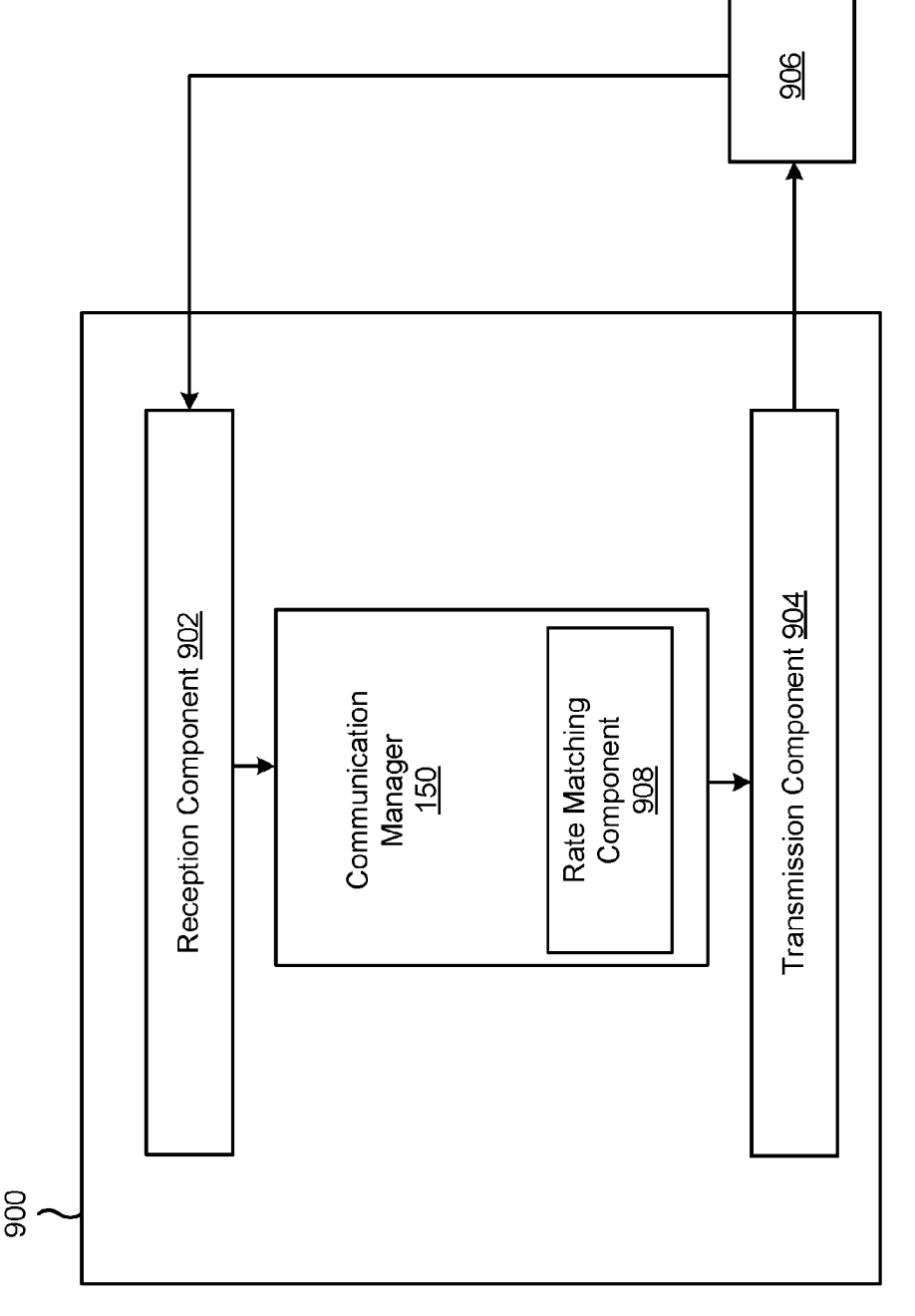

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a rate matching component 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The communication manager 150 and/or the reception component 902 may obtain an indication of at least one rate matching configuration. The communication manager 150, the reception component 902, and/or the transmission component 904 may communicate in a full duplex communication mode, wherein communicating in the full duplex communication mode comprises rate matching based at least in part on the at least one rate matching configuration. In some aspects, the communication manager 150 may include one or more antennas, a modulator, a transmit MIMO processor, a transmit processor, a controller/processor, a memory, or a combination thereof, of the UE described above in connection with FIG. 2. In some aspects, the communication manager 150 may include the reception component 902, the transmission component 904, and/or the rate matching component 908.

The transmission component 904 may transmit a PDSCH configuration, wherein the PDSCH configuration includes the rate match pattern list. The transmission component 904 may transmit an indication of one or more blanking parameters.

The rate matching component 908 may determine a rate matching configuration and/or perform a rate matching operation, among other examples. In some aspects, the rate matching component 908 may include one or more antennas, a modulator, a transmit MIMO processor, a transmit processor, a controller/processor, a memory, or a combination thereof, of the base station described above in connection with FIG. 2. In some aspects, the rate matching component 908 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: obtaining an indication of at least one rate matching configuration; and communicating in a full duplex communication mode, wherein communicating in the full duplex communication mode comprises rate matching based at least in part on the at least one rate matching configuration.

Aspect 2: The method of Aspect 1, wherein the at least one rate matching configuration comprises at least one downlink configuration, wherein communicating in the full duplex communication mode comprises transmitting a physical uplink shared channel (PUSCH) communication, and wherein transmitting the PUSCH communication comprises rate matching around the at least one downlink configuration.

Aspect 3: The method of Aspect 2, wherein the at least one downlink configuration comprises a downlink rate match pattern.

Aspect 4: The method of Aspect 3, wherein the downlink rate match pattern comprises a control resource set (CORESET) configuration.

Aspect 5: The method of either of Aspects 3 or 4, wherein obtaining the indication of the at least one downlink configuration comprises obtaining a rate match pattern list that indicates the downlink rate match pattern.

Aspect 6: The method of Aspect 5, wherein obtaining the rate match pattern list comprises receiving a physical downlink shared channel (PDSCH) configuration, wherein the PDSCH configuration includes the rate match pattern list.

Aspect 7: The method of any of Aspects 2-6, wherein the at least one downlink configuration comprises at least one of a synchronization signal block configuration or a periodic reference signal configuration corresponding to a channel state information reference signal (CSI-RS).

Aspect 8: The method of Aspect 7, wherein the CSI-RS comprises at least one of a non-zero power CSI-RS or a zero-power CSI-RS.

Aspect 9: The method of any of Aspects 2-8, wherein obtaining the indication of the at least one downlink configuration comprises receiving a serving cell configuration that indicates a cell specific reference signal (CRS).

Aspect 10: The method of any of Aspects 2-9, wherein the indication of the at least one downlink configuration comprises an indicator field of a downlink control information (DCI) transmission that indicates a set of rate matching resources for rate matching dynamically scheduled PUSCH transmissions, wherein the PUSCH communication comprises a dynamically scheduled transmission.

Aspect 11: The method of Aspect 10, wherein the indicator field of the DCI transmission indicates at least one of a downlink resource or a downlink numerology.

Aspect 12: The method of any of Aspects 1-11, wherein the at least one rate matching configuration comprises at least one uplink resource to be rate matched, wherein communicating in the full duplex communication mode comprises receiving a physical downlink shared channel (PDSCH) communication based at least in part on a rate matching operation associated with the at least one uplink resource.

Aspect 13: The method of Aspect 12, wherein the at least one uplink resource comprises at least one of: a sounding reference signal resource set identifier, a dedicated rate matching pattern, or an uplink numerology.

Aspect 14: The method of any of Aspects 1-13, further comprising: determining a first physical protocol level priority associated with a communication to be communicated; and determining a second physical protocol level priority associated with at least one resource indicated by the rate matching configuration, wherein the rate matching comprises rate matching based at least in part on the first physical protocol level priority and the second physical protocol level priority.

Aspect 15: The method of any of Aspects 1-14, further comprising: determining that an uplink communication channel has a first numerology; determining that a downlink communication channel has a second numerology that is different from the first numerology; determining a rate matching pattern based at least in part on the rate matching configuration; and blanking out at least one of a tone adjacent to the rate matching pattern or a symbol adjacent to the rate matching pattern.

Aspect 16: The method of Aspect 15, further comprising obtaining an indication of one or more blanking parameters, wherein blanking out the at least one of the tone or the symbol comprises blanking out the at least one of the tone or the symbol based at least in part on the indication of the one or more blanking parameters.

Aspect 17: The method of Aspect 16, wherein obtaining the indication of the one or more blanking parameters comprises at least one of receiving a radio resource control message or obtaining a numerology-specific blanking parameter table.

Aspect 18: A method of wireless communication performed by a base station, comprising: obtaining an indication of at least one rate matching configuration; and communicating in a full duplex communication mode, wherein communicating in the full duplex communication mode comprises rate matching based at least in part on the at least one rate matching configuration.

Aspect 19: The method of Aspect 18, wherein the at least one rate matching configuration comprises at least one downlink configuration, wherein communicating in the full duplex communication mode comprises receiving a physical uplink shared channel (PUSCH) communication, and wherein the PUSCH communication is rate matched around the at least one downlink configuration.

Aspect 20: The method of Aspect 19, wherein the at least one downlink configuration comprises a downlink rate match pattern.

Aspect 21: The method of Aspect 20, wherein the downlink rate match pattern comprises a control resource set (CORESET) configuration.

Aspect 22: The method of Aspect 21, wherein obtaining the indication of the at least one downlink configuration comprises obtaining a rate match pattern list that indicates the downlink rate match pattern.

Aspect 23: The method of Aspect 22, further comprising transmitting a physical downlink shared channel (PDSCH) configuration, wherein the PDSCH configuration includes the rate match pattern list.

Aspect 24: The method of any of Aspects 19-23, wherein the at least one downlink configuration comprises at least one of: a synchronization signal block configuration, a channel state information reference signal (CSI-RS), or a parameter that indicates a cell specific reference signal (CRS).

Aspect 25: The method of any of Aspects 19-24, wherein the indication of the at least one downlink configuration comprises an indicator field of a downlink control information (DCI) transmission that indicates a set of rate matching resources for rate matching dynamically scheduled PUSCH transmissions, wherein the PUSCH communication comprises a dynamically scheduled transmission, wherein the indicator field of the DCI transmission indicates at least one of a downlink resource or a downlink numerology.

Aspect 26: The method of any of Aspects 18-25, wherein the at least one rate matching configuration comprises at least one uplink resource to be rate matched, wherein communicating in the full duplex communication mode comprises transmitting a physical downlink shared channel (PDSCH) communication based at least in part on a rate matching operation associated with the at least one uplink resource.

Aspect 27: The method of Aspect 26, wherein the at least one uplink resource comprises at least one of: a sounding reference signal resource set identifier, a dedicated rate matching pattern, or an uplink numerology.

Aspect 28: The method of any of Aspects 18-27, further comprising transmitting an indication of one or more blanking parameters.

Aspect 29: An apparatus for wireless communication at a device, comprising a processor; memory coupled with the processor; and instructions stored in the memory and executable by the processor to cause the apparatus to perform the method of one or more of Aspects 1-17.

Aspect 30: A device for wireless communication, comprising a memory and one or more processors coupled to the memory, the one or more processors configured to perform the method of one or more of Aspects 1-17.

Aspect 31: An apparatus for wireless communication, comprising at least one means for performing the method of one or more of Aspects 1-17.

Aspect 32: A non-transitory computer-readable medium storing code for wireless communication, the code comprising instructions executable by a processor to perform the method of one or more of Aspects 1-17.

Aspect 33: A non-transitory computer-readable medium storing a set of instructions for wireless communication, the set of instructions comprising one or more instructions that, when executed by one or more processors of a device, cause the device to perform the method of one or more of Aspects 1-17.

Aspect 34: An apparatus for wireless communication at a device, comprising a processor; memory coupled with the processor; and instructions stored in the memory and executable by the processor to cause the apparatus to perform the method of one or more of Aspects 18-28.

Aspect 35: A device for wireless communication, comprising a memory and one or more processors coupled to the memory, the one or more processors configured to perform the method of one or more of Aspects 18-28.

Aspect 36: An apparatus for wireless communication, comprising at least one means for performing the method of one or more of Aspects 18-28.

Aspect 37: A non-transitory computer-readable medium storing code for wireless communication, the code comprising instructions executable by a processor to perform the method of one or more of Aspects 18-28.

Aspect 38: A non-transitory computer-readable medium storing a set of instructions for wireless communication, the set of instructions comprising one or more instructions that, when executed by one or more processors of a device, cause the device to perform the method of one or more of Aspects 18-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      obtain an indication of at least one rate matching configuration in which a first numerology of an uplink communication and a second numerology of a downlink communication are different; and
      communicate in a full duplex communication mode, wherein the one or more processors, to communicate in the full duplex communication mode, are configured to rate match based at least in part on the at least one rate matching configuration.

2. The UE of claim 1, wherein the at least one rate matching configuration comprises at least one downlink configuration,
   wherein the one or more processors, to communicate in the full duplex communication mode, are configured to transmit a physical uplink shared channel (PUSCH) communication, and wherein the one or more processors, to transmit the PUSCH communication, are configured to rate match around the at least one downlink configuration.

3. The UE of claim 2, wherein the at least one downlink configuration comprises a downlink rate match pattern.

4. The UE of claim 3, wherein the downlink rate match pattern comprises a control resource set (CORESET) configuration.

5. The UE of claim 3, wherein the one or more processors, to obtain the indication of the at least one downlink configuration, are configured to obtain a rate match pattern list that indicates the downlink rate match pattern.

6. The UE of claim 5, wherein the one or more processors, to obtain the rate match pattern list, are configured to receive a physical downlink shared channel (PDSCH) configuration, wherein the PDSCH configuration includes the rate match pattern list.

7. The UE of claim 2, wherein the at least one downlink configuration comprises at least one of a synchronization signal block configuration or a periodic reference signal configuration corresponding to a channel state information reference signal (CSI-RS).

8. The UE of claim 7, wherein the CSI-RS comprises at least one of a non-zero power CSI-RS or a zero-power CSI-RS.

9. The UE of claim 2, wherein the one or more processors, to obtain the indication of the at least one downlink configuration, are configured to receive a serving cell configuration that indicates a cell specific reference signal (CRS).

10. The UE of claim 2, wherein the indication of the at least one downlink configuration comprises an indicator field of a downlink control information (DCI) transmission that indicates a set of rate matching resources for rate matching dynamically scheduled PUSCH transmissions, wherein the PUSCH communication comprises a dynamically scheduled transmission.

11. The UE of claim 10, wherein the indicator field of the DCI transmission indicates at least one of a downlink resource or the second numerology of the downlink communication.

12. The UE of claim 1, wherein the at least one rate matching configuration comprises at least one uplink resource to be rate matched,
   wherein the one or more processors, to communicate in the full duplex communication mode, are configured to receive a physical downlink shared channel (PDSCH) communication based at least in part on a rate matching operation associated with the at least one uplink resource.

13. The UE of claim 12, wherein the at least one uplink resource comprises at least one of:
   a sounding reference signal resource set identifier,
   a dedicated rate matching pattern, or
   the first numerology of the uplink communication.

14. The UE of claim 1, wherein the one or more processors are further configured to:
   determine a first physical protocol level priority associated with a communication to be communicated; and
   determine a second physical protocol level priority associated with at least one resource indicated by the rate matching configuration,
      wherein the rate matching comprises rate matching based at least in part on the first physical protocol level priority and the second physical protocol level priority.

15. The UE of claim 1, wherein the one or more processors are further configured to:
   determine a rate matching pattern based at least in part on the rate matching configuration; and
   blank out at least one of a tone adjacent to the rate matching pattern or a symbol adjacent to the rate matching pattern.

16. The UE of claim 15, wherein the one or more processors are further configured to obtain an indication of one or more blanking parameters, wherein the one or more processors, to blank out the at least one of the tone or the symbol, are configured to blank out the at least one of the tone or the symbol based at least in part on the indication of the one or more blanking parameters.

17. The UE of claim 16, wherein the one or more processors, to obtain the indication of the one or more blanking parameters, are configured to receive a radio resource control message or obtaining a numerology-specific blanking parameter table.

18. A base station for wireless communication, comprising:
   a memory; and
   one or more processors, coupled to the memory, configured to:
      obtain an indication of at least one rate matching configuration in which a first numerology of an uplink communication and a second numerology of a downlink communication are different; and communicate in a full duplex communication mode, wherein the one or more processors, to communicate in the full duplex communication mode, are configured to rate match based at least in part on the at least one rate matching configuration.

19. The base station of claim 18, wherein the at least one rate matching configuration comprises at least one downlink configuration, wherein the one or more processors, to communicate in the full duplex communication mode, are configured to receive a physical uplink shared channel (PUSCH) communication, and wherein the PUSCH communication is rate matched around the at least one downlink configuration.

20. The base station of claim 19, wherein the at least one downlink configuration comprises a downlink rate match pattern.

21. The base station of claim 20, wherein the downlink rate match pattern comprises a control resource set (CORE-SET) configuration.

22. The base station of claim 21, wherein the one or more processors, to obtain the indication of the at least one downlink configuration, are configured to obtain a rate match pattern list that indicates the downlink rate match pattern.

23. The base station of claim 22, wherein the one or more processors are further configured to transmit a physical downlink shared channel (PDSCH) configuration, wherein the PDSCH configuration includes the rate match pattern list.

24. The base station of claim 19, wherein the at least one downlink configuration comprises at least one of:

a synchronization signal block configuration, a channel state information reference signal (CSI-RS), or a parameter that indicates a cell specific reference signal (CRS).

25. The base station of claim 19, wherein the indication of the at least one downlink configuration comprises an indicator field of a downlink control information (DCI) transmission that indicates a set of rate matching resources for rate matching dynamically scheduled PUSCH transmissions, wherein the PUSCH communication comprises a dynamically scheduled transmission, wherein the indicator field of the DCI transmission indicates at least one of a downlink resource or the second numerology of the downlink communication.

26. The base station of claim 18, wherein the at least one rate matching configuration comprises at least one uplink resource to be rate matched, wherein the one or more processors, to communicate in the full duplex communication mode, are configured to transmit a physical downlink shared channel (PDSCH) communication based at least in part on a rate matching operation associated with the at least one uplink resource.

27. The base station of claim 26, wherein the at least one uplink resource comprises at least one of:

a sounding reference signal resource set identifier, a dedicated rate matching pattern, or the first numerology of the uplink communication.

28. The base station of claim 18, wherein the one or more processors are further configured to transmit an indication of one or more blanking parameters.

29. A method of wireless communication performed by a user equipment (UE), comprising:

obtaining an indication of at least one rate matching configuration in which a first numerology of an uplink communication and a second numerology of a downlink communication are different; and communicating in a full duplex communication mode, wherein communicating in the full duplex communication mode comprises rate matching based at least in part on the at least one rate matching configuration.

30. A method of wireless communication performed by a base station, comprising:

obtaining an indication of at least one rate matching configuration in which a first numerology of an uplink communication and a second numerology of a downlink communication are different; and communicating in a full duplex communication mode, wherein communicating in the full duplex communication mode comprises rate matching based at least in part on the at least one rate matching configuration.

\* \* \* \* \*